United States Patent [19]

Leibhard et al.

[11] Patent Number: 4,968,185
[45] Date of Patent: Nov. 6, 1990

[54] METAL MESH SLEEVE FOR DOWEL ASSEMBLY

[75] Inventors: Erich Leibhard, Munich, Fed. Rep. of Germany; André Luescher, Sevelen, Switzerland

[73] Assignee: Hilti Aktiengesellschaft

[21] Appl. No.: 339,727

[22] Filed: Apr. 18, 1989

[30] Foreign Application Priority Data

Apr. 18, 1988 [DE] Fed. Rep. of Germany ....... 3812913

[51] Int. Cl.⁵ .............................................. E04B 1/38
[52] U.S. Cl. .................................... 405/260; 405/259; 52/670; 52/704
[58] Field of Search ........................ 405/259, 258, 260; 52/670, 704

[56] References Cited

U.S. PATENT DOCUMENTS

| | | | |
|---|---|---|---|
| 4,139,323 | 2/1979 | Brandstetter | 405/260 |
| 4,313,696 | 2/1982 | Horten | 405/259 |
| 4,314,778 | 2/1982 | Cantrel | 405/259 |
| 4,620,406 | 11/1986 | Hugel et al. | 52/704 |
| 4,696,606 | 9/1987 | Herron | 405/259 |
| 4,773,794 | 9/1988 | Harke | 405/260 |
| 4,787,186 | 11/1988 | Irmscher et al. | 405/260 X |

FOREIGN PATENT DOCUMENTS

| | | | |
|---|---|---|---|
| 955678 | 1/1957 | Fed. Rep. of Germany | 405/260 |
| 2410772 | 9/1974 | Fed. Rep. of Germany | 405/260 |
| 2615316 | 10/1977 | Fed. Rep. of Germany | . |
| 131228 | 8/1983 | Japan | 405/258 |
| 52023 | 3/1984 | Japan | 405/258 |
| 796449 | 1/1981 | U.S.S.R. | 405/260 |

*Primary Examiner*—Dennis L. Taylor
*Assistant Examiner*—John A. Ricci
*Attorney, Agent, or Firm*—Toren, McGeady & Associates

[57] ABSTRACT

A dowel assembly for use as an anchor in a structural material, such as a light and hollow structural material, includes an axially extending sleeve formed of expanded metal for receiving a hardenable mass and an anchor member. The sleeve is closed at its leading end and is open at its trailing end. The leading end is closed by folds formed in the expanded metal and the trailing end has an outwardly projecting flange. Such a sleeve fabricated from expanded metal is inherently stiff and can be produced economically.

14 Claims, 1 Drawing Sheet

METAL MESH SLEEVE FOR DOWEL ASSEMBLY

BACKGROUND OF THE INvENTION

The present invention is directed to a dowel assembly for use as an anchor, particularly in light and hollow structural material, and includes a metal mesh or expanded metal sleeve for receiving a hardenable mass and an anchor member.

Anchors using a hardenable mass are provided by the adhesive connection of the hardenable mass with a borehole wall and by a positive lock afforded by the hardenable mass entering in cavities or openings in the receiving material in which the borehole is formed. In such an anchor, uncontrolled flow of the hardenable mass before it hardens must be prevented, particularly in materials having large cavities or openings. In DE-0S 2 615 316, a hardenable mass is introduced into a screen-like sleeve formed of a plastics material net. Basically, the hardenable mass remains in the sleeve with the net expanding in the region of any cavities or openings. The inherent stiffness of such a sleeve formed of net material is quite low, so that the sleeve has to be stiffened by a support member introduced into the sleeve and, as a result, considerable additional effort is required for the placement of the sleeve.

Other screen-like sleeves utilized in the same manner have been formed of a wire grid. The formation of a wire grid into a screen-like sleeve is very expensive, since the individual wires must be prevented from being disentangled in the edge region of a blank forming the sleeve, whereby fringed edges are formed in the wire grid.

SUMMARY OF THE INVENTION

Therefore, the primary object of the present invention is to provide a screen-like sleeve for a dowel assembly to be secured in place by a hardenable mass, with the sleeve being economical and easy to manufacture.

In accordance with the present invention, the sleeve is formed from a metal mesh and more specifically expanded metal. The expanded metal is produced from sheet metal by cutting or stamping slots into the metal sheet in a mesh-like arrangement and subsequently stretching the metal sheet transversely of the slots. Fabrication costs of such expanded metal are about one-half for those of a corresponding wire mesh, since the invention is directed to a mass-produced item which can be fabricated in any desired length and width.

The sleeve has a leading end, inserted first into a borehole, and a trailing end. The leading end is closed by folds formed in the expanded metal. With the leading end of the sleeve closed, the hardenable mass can pass through the metal mesh into the surrounding open space or cavities. The folds can be produced before or after the flat metal mesh is rolled into a sleeve.

In a preferred arrangement, the sleeve has stop means at its trailing end. Such stop means act to limit the depth to which the sleeve is inserted into a borehole. Stop means can be formed as individual projections abutting the surface of the receiving material containing the borehole into which the sleeve is inserted. In another advantageous embodiment, the stop means is in the form of a flange. The flange reinforces the trailing end of the sleeve which is especially highly stressed when an anchor member is inserted. Further, the flange forms a closure for the borehole preventing the escape of any hardenable mass.

In addition, it is appropriate to equip the sleeve with retaining means. Such retaining means secure the sleeve in the axial direction when it is inserted into the borehole. Accordingly, the sleeve is prevented from pulling out of the borehole, along with the filling stub of a metering device used for injecting the hardenable mass into the borehole. The retaining means can be in the form of protruding lugs. It is particularly desirable, however, to form the retaining means as outwardly projecting tabs, whereby the tabs can adapt to different diameters of the borehole.

Considerable pressure can be developed when the hardenable mass is injected into the sleeve. To prevent deformation of the sleeve, due to such pressure, it is advantageous if the sleeve is formed of a rolled strip, with its axially extending edges formed in an interconnected manner. The axially extending edges can be connected to one another by bonding, solderinq or welding. Since expanded metal is easily deformable, axially extending edges can be interconnected by folding the edges over in an interengaged manner. Such a connection affords a positive lock and is capable of withstanding high loads. The folded-over interlocking of the axially extending edges can be achieved in a single working operation after the metal mesh strip has been rolled.

For producing the sleeve, it is expedient if the expanded metal parts defining the mesh openings have a length in the range of 0.6 to 3 mm. The width of the expanded metal parts can be in the range of approximately 0.2 to 1.5 mm.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
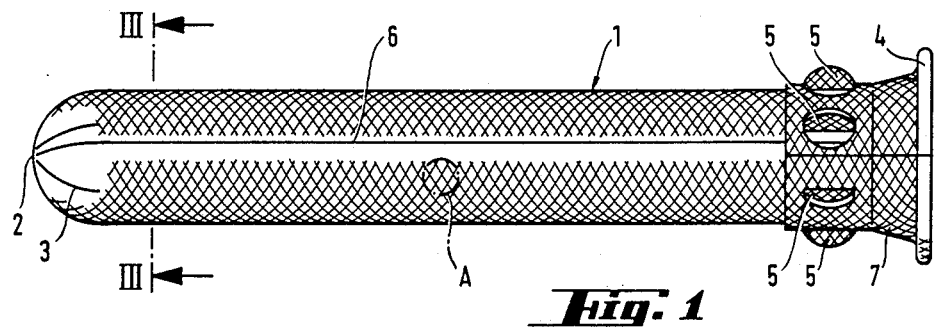
FIG. 1 is an axially extending side view of a mesh-like sleeve embodying the present invention and used in a dowel assembly.
Figures 2, 3:
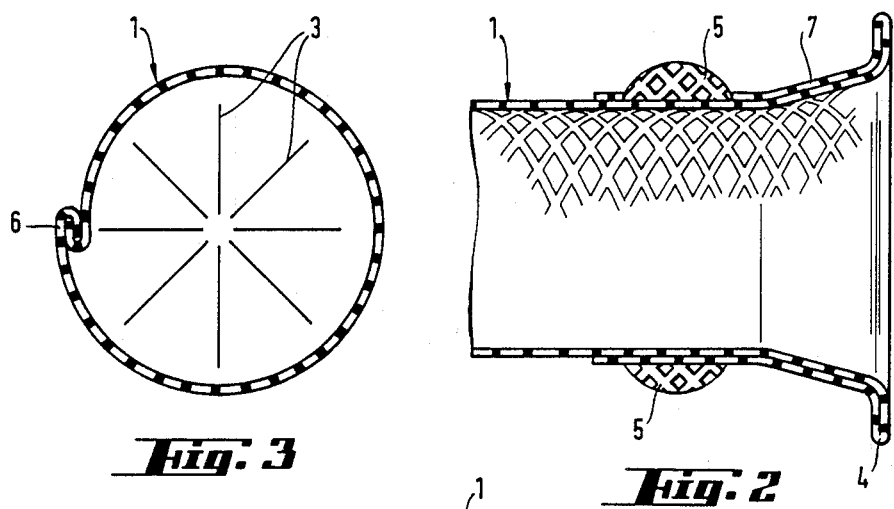
FIG. 2 is a partial enlarged axially extending sectional view of the sleeve displayed in FIG. 1.
FIG. 3 is an enlarged cross-sectional view of the sleeve taken along the line III—III in FIG. 1.

In FIGS. 1 to 3, an axially extending sleeve 1 is shown with a leading end 2 and a trailing end. The sleeve 1 is part of a dowel assembly to be inserted into a borehole in a receiving material, not shown. The leading end 2 of the sleeve is closed by a number of folds 3. At its trailing end, the sleeve has an outwardly extending flange 4. As can be seen in FIG. 2, the material forming the sleeve is doubled over upon itself for an axially extending portion of the sleeve from its trailing end toward the leading end. The double-over portion affords a double wall thickness for the sleeve in the region adjacent the flange 4. In the doubled over portion of the sleeve, tabs 5 project outwardly. Tabs 5 are stamped out of and bent outwardly from a section or strip of expanded metal used to form the sleeve. When the sleeve 1 is inserted into a borehole in the receiving material, tabs 5 serve as retaining means securing the sleeve against displacement. Sleeve 1 is rolled from a section or strip of expanded metal and, as shown in FIG. 3, the axially extending edges 6 are folded over in an interlocking hook-like manner. The interlocking hook-like engagement of the axially extending edges 6 afford a simple and secure axially extending closure of the sleeve. With the axially extending edges interlocked, the sleeve cannot be split open even if a hardenable mass is introduced into the sleeve at a high pressure. The axially extending section 7 of the sleeve 1 extending axially from the flange 4 is conically shaped with its surfaces converging inwardly toward the leading end 2. The conically shaped section serves to center the sleeve 1 in the borehole and, in addition, facilitates the insertion of a filling stub for injecting the hardenable mass into the sleeve 1.

Figure 4:
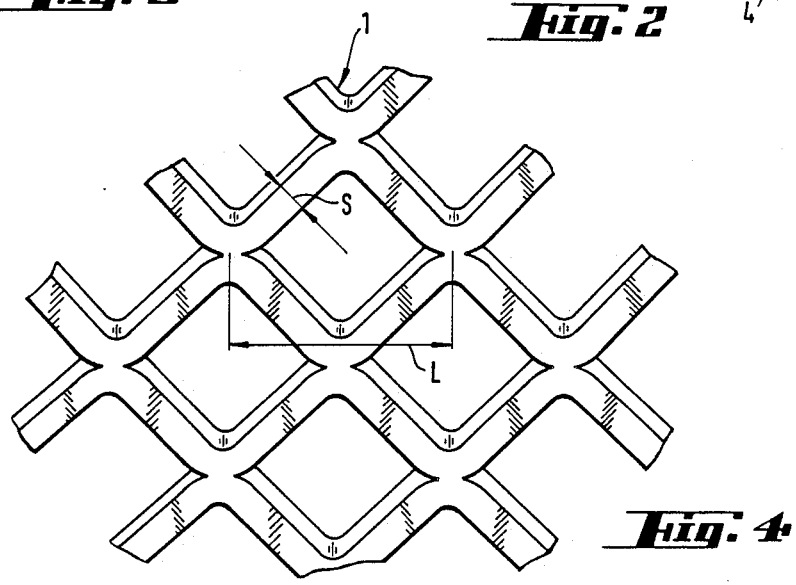
FIG. 4 is a greatly enlarged view of the encircled portion of the sleeve designated A in FIG. 1.

In FIG. 4, there is a greatly enlarged view of the expanded metal forming the sleeve, note FIG. 1. The metal mesh is formed from sheet metal in which the openings are stamped out leaving rib-like parts defining the mesh openings. The rib-like parts defining the mesh openings have an axial length L in the range of 0.6 to 3.0 mm. In addition, the rib-like parts having a width L of about 0.2 to 1.5 mm.

While specific embodiments of the invention have been shown and described in detail to illustrate the application of the inventive principles, it will be understood that the invention may be embodied otherwise without departing from such principles.

We claim:

1. Dowel assembly, for use as an anchor in a structural material such as a light and hollow structural material, comprising an axially extending mesh-like sleeve for receiving a hardenable mass and an anchor member, wherein the improvement comprises that the sleeve is formed of expanded metal.

2. Dowel assembly, as set forth in claim 1, wherein, said sleeve has a leading end arranged to be inserted first into a borehole in a receiving material and an opposite trailing end, and the leading end is closed by folds formed in the expanded metal.

3. Dowel assembly, as set forth in claim 2, wherein stop means are located at the trailing end of the sleeve for limiting the insertion of the sleeve into the borehole.

4. Dowel assembly, as set forth in claim 3, wherein retaining means are formed on said sleeve for holding the sleeve in the borehole.

5. Dowel assembly, as set forth in claim 4, wherein said sleeve has an axially extending section extending from the trailing end thereof with said expanded metal being doubled over, and said retaining means being formed in said doubled-over section.

6. Dowel assembly, as set forth in claim 5, wherein said retaining means comprises tabs punched outwardly from said doubled-over section.

7. Dowel assembly, as set forth in claim 1, wherein said sleeve is formed of a rolled strip of expanded metal formed from sheet metal.

8. Dowel assembly, as set forth in claim 7, wherein said rolled expanded metal strip has edges extending in the axial direction of said sleeve with said edges being connected together.

9. Dowel assembly, as set forth in claim 8, wherein said axially extending edges are folded over in a hook-like form with the hook-like edges in inter-engagement.

10. Dowel assembly, as set forth in claim 1, wherein said expanded metal has openings therethrough defined by rib-like parts, said rib-like parts defining said openings having an axial length in the range of 0.6 to 3.0 mm.

11. Dowel assembly, as set forth in claim 10, wherein said rib-like parts have a width in the range of 0.2 to 1.5 mm.

12. Dowel assembly, for use as an anchor in a structure material such as a light and hollow structural material, comprising an axially extending mesh-like sleeve for receiving a hardenable mass and an anchor member, wherein the improvement comprises that the sleeve is formed of a metal mesh, said sleeve is formed of a rolled strip of metal mesh formed from sheet metal, said rolled metal mesh strip has edges extending in the axial direction of said sleeve with said edges being connected together, and said axially extending edges are folded over in a hook-like form with the hook-like edges in interengagement.

13. Dowel assembly, as set forth in claim 12, wherein said sleeve has an axially extending section extending from a trailing end thereof with said axially extending section being doubled over, and retaining means being formed in said doubled-over section.

14. Dowel assembly, as set forth in claim 13, wherein said retaining means comprises tabs punched outwardly from said doubled over section.

* * * * *